Oct. 28, 1958 W. ULRICH 2,858,524

RECORDING SCANNER

Filed Nov. 13, 1953 5 Sheets-Sheet 1

INVENTOR
W. ULRICH
BY
J. W. Schmied
ATTORNEY

FIG. 2
CONNECTION TO SENDER
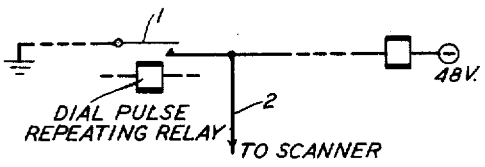
FIG. 3
DIODE KEYER
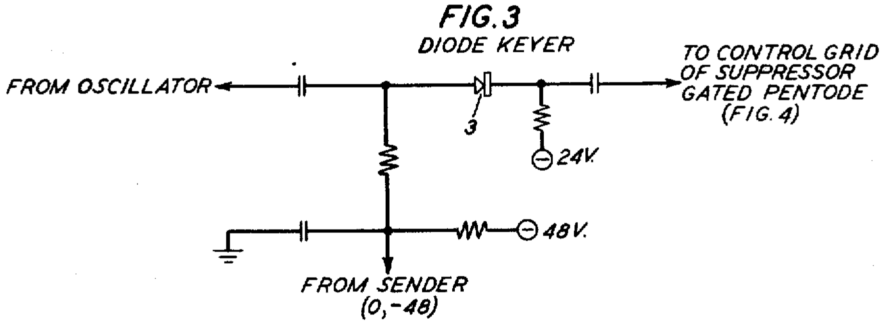
FIG. 4
PENTODE GATE
FIG. 5
COMMON LOAD
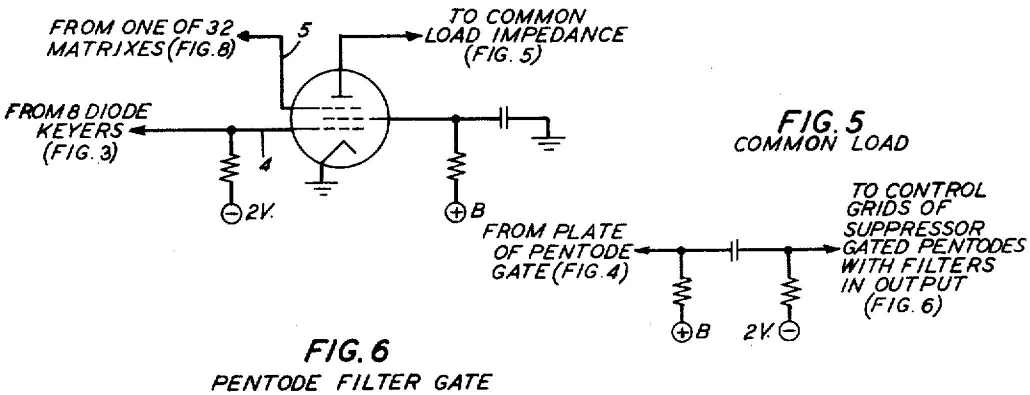
FIG. 6
PENTODE FILTER GATE
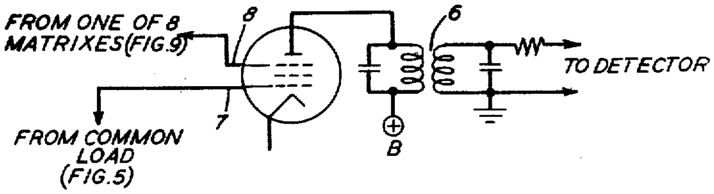
INVENTOR
W. ULRICH
BY
ATTORNEY

INVENTOR
W. ULRICH
BY
ATTORNEY

INVENTOR
W. ULRICH
BY J W Schmied
ATTORNEY

Oct. 28, 1958 W. ULRICH 2,858,524

RECORDING SCANNER

Filed Nov. 13, 1953 5 Sheets-Sheet 5

INVENTOR
W. ULRICH
BY J. W. Schmied
ATTORNEY 2,858,524

RECORDING SCANNER

Werner Ulrich, New York, N. Y., assignor to Bell Telephone Laboratories, Incorporated, New York, N. Y., a corporation of New York Application November 13, 1953, Serial No. 391,900

15 Claims. (Cl. 340—174)

This invention relates to means for and methods of scanning the conditions of a plurality of devices having changing conditions under control of binary numbers and identifying such devices, whereby an ordered sequence of the present conditions of such devices is recorded. In other words, the invention relates to scanning systems and methods for consecutively and at high speed indicating or recording sequentially the present condition of a large number of lines, dials, relays, senders, or similar instruments, and for making the indications or establishment of the records in ordered identical form whereby the record for each scanned line, etc. may be utilized separately from the records of the others.

Scanners are disclosed in the prior art and although these are quite operable and useful, they suffer from certain limitations, to remove which is an object of this invention. Such scanners include capacity and cathode ray scanning devices which are difficult to maintain in continuing satisfactory operation at adequately high speeds without cross-fire or cross-indication from one scanned device into the scanning and output of another device.

Another object of this invention is to provide a scanner which will operate with relatively low power consumption when compared to known types.

An additional object of this invention is to provide a scanner having a higher degree of flexibility than previous scanners. In certain known scanners such as capacity scanners, a segment or portion of the scanning means and memory means corresponds to a particular sending device and remains permanently associated therewith. In the present invention this limitation is reduced by the ability to vary with facility the locations on the selecting means assigned to particular senders. In this manner the selecting means may be steered to the particular sender is desired.

Further objects are to improve the accuracy of operation of scanners, and, more generally, to provide a type of device which may constitute a portion of equipment which may conveniently be added to existing systems to enlarge the scope thereof.

According to an exemplary embodiment of the invention as disclosed herein, the devices to be scanned are dial pulse repeating relays. In the operated condition of such a relay it is arranged to supply a suitable voltage over a lead to the scanner and in the unoperated condition the voltage supplied is changed. Specifically, the voltage in the operated condition may approximate zero and the unoperated condition, 48 volts negative. Each such device to be scanned is assigned a binary number of adequately numerous digits which is recorded on a binary number recording device such as a rotatable magnetic drum. In this exemplary embodiment the scanning of two hundred and fifty-six relays is to be accomplished and each of these is to be identified in its own individual slot on the drum by an eight-digit binary number. Consequently, the binary numbers, if one starts with zero, may be considered to extend from 00000000 to 11111111. The devices are scanned for the existence of one or the other of the two conditions. Whenever the condition of any device changes, a corresponding record is made. For scanning relays which operate in accordance with dial pulses, correct scanning requires that the drum be rotated at a speed at least sufficient to scan the relay once during the time of the shortest make or break period of the scanned relay, with an adequate allowance for irregularities of relay operation due to distortion or other causes.

The binary number recording device selects and assigns time periods for each device, during which the condition of each device to be scanned is indicated. The equipment for doing this includes scanning heads equal in number to the binary digits for controlling flip-flops which, in turn, control matrices. These, in turn, control the establishment of an individual channel for a minute period of time from each device to be scanned to a recording head which conveniently may be operatively associated with the same drum upon which the binary numbers are recorded. A single output lead extends to this recording head and, as the drum revolves, it records successively in each of the two hundred and fifty-six groups of slots of the drum the condition of the corresponding sender relay scanned.

In order to facilitate detecting and amplifying the conditions to be scanned, eight relatively high frequency oscillators are provided, and each of these is associated with one-eighth of the sender relays, whereby each oscillator controls one-eighth of two hundred and fifty-six diode keyers, each corresponding to the two hundred and fifty-six sender relays.

The binary digits on the magnetic drum, in this present exemplary embodiment, are divided into two groups, of which the first group consists of five digits, and the second group consists of three digits. The first group controls a diode matrix which causes the selective energization of one lead out of thirty-two and the other three digits control a matrix of diodes which selectively energizes one out of eight pentode filter gates, with the result that the detector amplifier and output lead are each supplied at any instant of time with a signal of one frequency or no signal, under control of the device to be scanned.

The operation of a system including this invention contemplates that the magnetic drum has recorded thereon in proper relationship the spots or conditions constituting the two hundred and fifty-six binary numbers, and means are known whereby this may be done. The output, in accordance with the present invention, all appears on the single lead which successively energizes the writing head for recording the existing conditions of the devices to be scanned on the drum. This record can be used in any desired manner but it will be pointed out hereinafter that devices exist in the art whereby the succession of registered conditions impressed upon the drum by this writing head may be utilized to set up registrations representing the digits in accordance with which the scanned device is operated. While an eight frequency scanner is the embodiment presented as illustrative, it will be understood that a greater or lesser number of separate frequencies may be utilized. For example, if sixteen unique frequencies are employed, five hundred and twelve sender relays may be scanned by using a total of nine binary digits on the drum. These binary digits would compose two groups. The first group of five digits would control a diode matrix which selectively energizes one lead out of thirty-two and the second group of four digits would control a diode matrix which selectively energizes one out of sixteen pentode filter gates.

It will also be be apparent that if only a single frequency is utilized to scan thirty-two sender relays, only five binary digits are required on the drum and would compose one group. This group would control a diode matrix that selectively energizes one lead out of the thirty-two corresponding to the one relay out of thirty-two being scanned at that time. In this type of single frequency scanner only one group of gating elements is required; the second group of frequency selective gating elements shown in the exemplary embodiment of an eight frequency scanner may be omitted. This type of single frequency scanner for thirty-two relays, when operated in conjunction with seven other scanners of differing frequencies, will be seen to constitute the eight frequency scanner to be explained herein.

The exemplary embodiment of the invention, in the form of an eight frequency scanner, will be further described in connection with the attached drawings in which:

Fig. 2 is a circuit diagram of the connection of a sender relay to the scanner;

Fig. 3 is a circuit diagram of the diode keyers which are elements of Fig. 1;

Fig. 4 is a circuit diagram of the pentode gates which are elements of Fig. 1;

Fig. 5 is a circuit diagram of the common load impedance which is an element of Fig. 1;

Fig. 6 is a circuit diagram of one of the pentode filter gates which are elements of Fig. 1;

The operation of the scanner may be explained by tracing the signal which indicates the condition, 0 or —48 volts, of the sender or device scanned.

Figure 8:
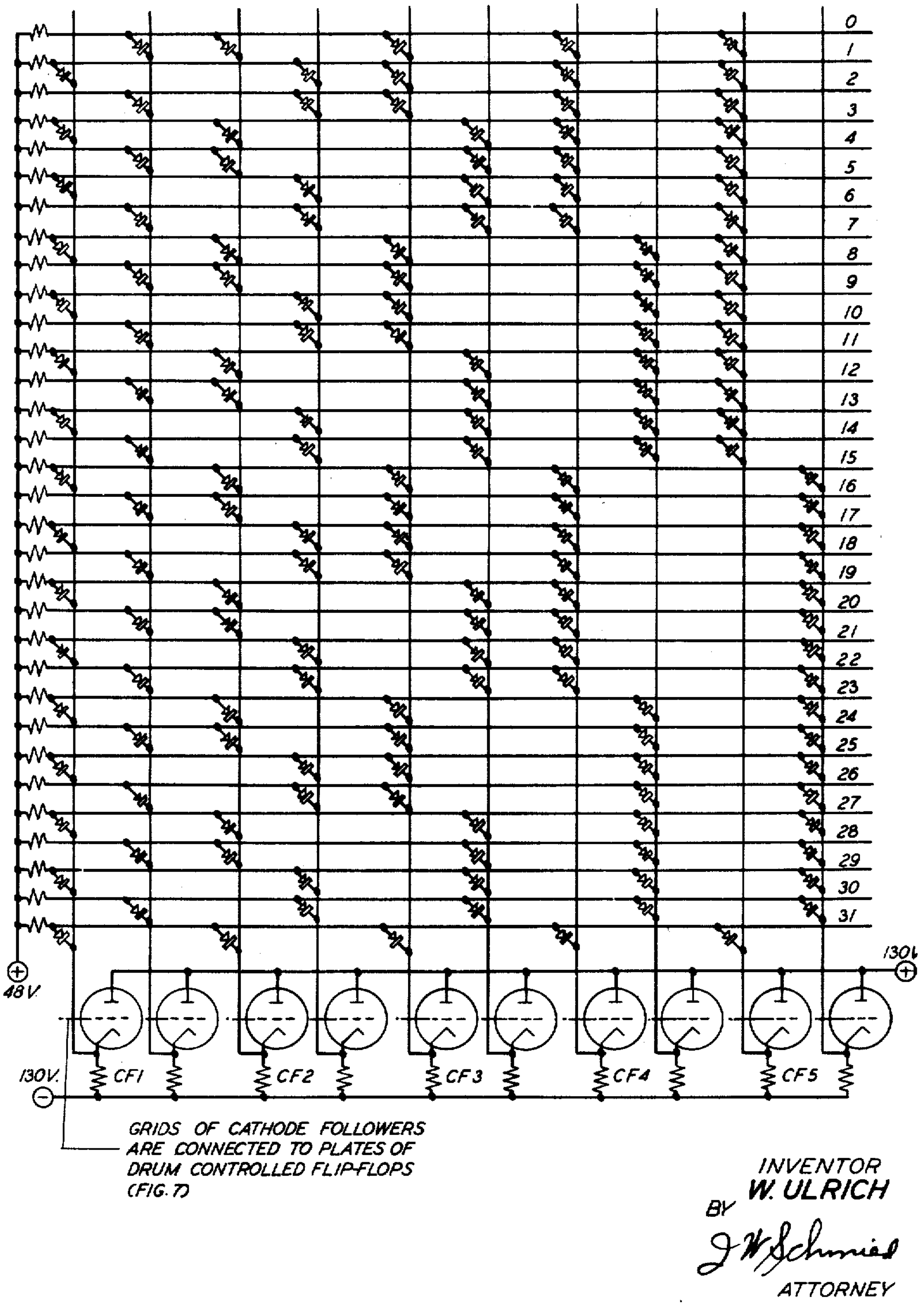
Fig. 8 is a diagram of the matrix which under the control of the drum energizes one output lead to one suppressor gated pentode out of a first group of thirty-two.

Using sender 7 (Fig. 1) as an illustration, and assuming that the signals to be scanned are in the form of pulses such as telephone dial pulses, the scanning operation is seen to originate at the connection to the sender in Fig. 2. Fig. 2 shows a dial pulse repeating relay 1 which repeats the telephone dial pulses by intermittently connecting the scanner input 2 from sender 7 to 0 or —48 volts. The sender or dial pulse repeating relay 1 shown in Fig. 8 is indicative of the two hundred and fifty-six senders that are to be scanned.

Figure 1:
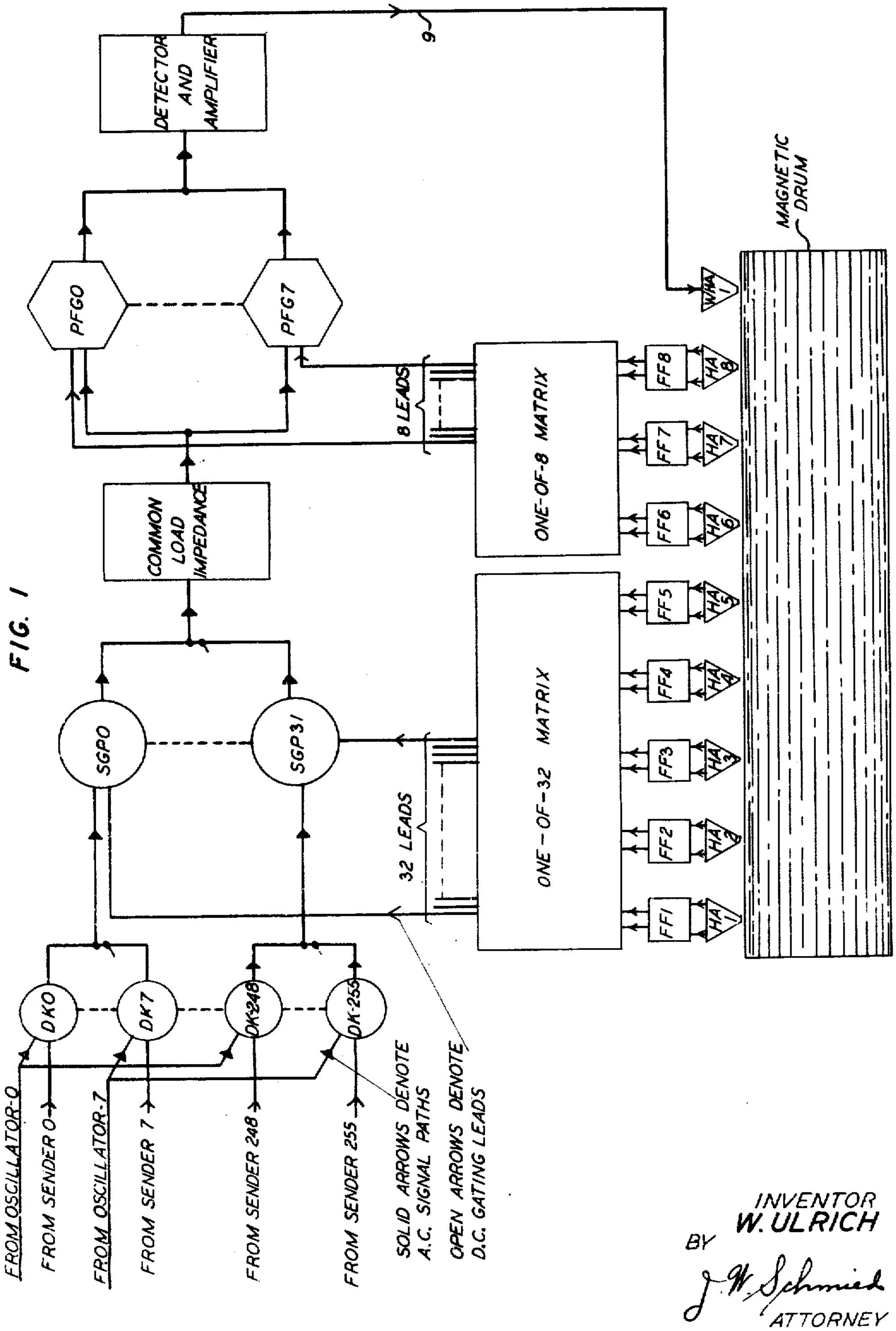
Fig. 1 is a block diagram of the entire system.

Assume now that the sender relay is in the active position and an active signal of 0 volts is transmitted to the scanner. Fig. 1 shows that the signal from sender 7 is transmitted to a diode keyer DK7. This diode keyer is shown in detail in Fig. 3. Each of the two hundred and fifty-six sender relays is connected to an associated diode keyer, i. e., sender 0 to diode keyer DK0, sender 7 to diode keyer DK7, etc. Although only four diode keyers are shown in Fig. 1, it will be understood that two hundred and fifty-six diode keyers are utilized. Fig. 3 shows that the diode keyer is used to gate pulses of relatively high frequency current supplied by an oscillator. Diode keyer DK7 is connected to oscillator 7, one of eight separate oscillators each having a distinct frequency. Each oscillator is connected to thirty-two diode keyers, i. e., oscillator 0 is connected to diode keyers DK0, DK8, DK16, DK24, DK32 and every eighth keyer thereafter until DK248 is reached. Oscillator 7 is connected to diode keyers DK7, DK15, DK23, DK31, DK39 and every eighth keyer thereafter until DK255 is reached.

Referring again to diode keyer DK7 we see from Fig. 1 and Fig. 3 that if the sender is in the active condition, zero volts, the diode 3 is biased conductively and current at the frequency of oscillator 7 is transmitted to the control grid 4 of the pentode gate SGP0 of Fig. 1.

The pentode gate SGP0 is one of thirty-two identical pentode gates of which only two are shown in Fig. 1. A detail of the pentode gate is shown in Fig. 4. It will be seen that a total of eight diode keyers is connected to the control grid 4 of each pentode gate. For example diode keyers DK0 to DK7 are connected to the control grid 4 of pentode gate SGP0 and diode keyers DK248 to DK255 are connected to pentode gate SGP31. Thus far, with sender 7 active, we have traced a high frequency signal as far as the control grid 4 of pentode gate SGP0. But from the above it may be seen that if any of the other senders and diode keyers supplying the control grid of pentode gate SGP0 are active, i. e., senders 0 to 6, then for each active sender and diode keyer there will be a signal on the control grid 4 of pentode gate SGP0 at a frequency equal to the frequency of the oscillator supplying the particular diode keyer. In the maximum case there may be as many as eight separate frequencies corresponding to the frequencies of oscillators 0 to 7 all superimposed simultaneously on the control grid 4 of pentode gate SGP0.

Continuing to trace the signal from sender 7, it may be seen that in order for that signal, which has arrived at the control grid 4 of pentode gate SGP0, to be transmitted to the next stage of selection in the scanner, a positive pulse must be applied to the suppressor grid 5 of pentode gate SGP0. This positive pulse is applied by the one out of thirty-two matrix which is controlled by the binary digits recorded on the magnetic drum.

Figure 7:
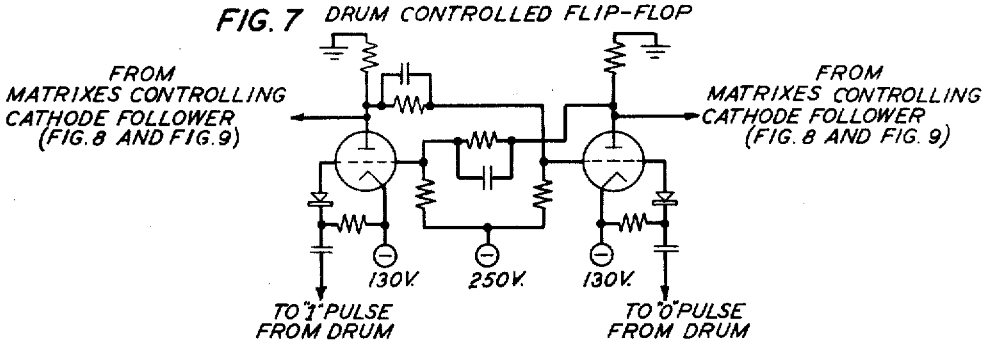
Fig. 7 is a circuit diagram of one of the drum controlled flip-flop circuits which is an element of Fig. 1.

As explained previously there are two hundred and fifty-six eight-digit binary numbers recorded on the magnetic drum in two groups, the first group having five digits, and the second group three digits. The first group of five digits controls the one of thirty-two matrix as follows: There are five read-write magnetic heads and amplifiers HA1 to HA5, to read the first group of five digits. The output from each read-write head and its respective amplifier is fed into a bi-stable flip-flop circuit, FF1 to FF5, a detail of which is shown in Fig. 7. It may be seen from Fig. 7 that a 1 pulse from the read amplifier will produce a given condition on the flip-flop while a 0 pulse will produce the alternate condition. The output of each flip-flop is fed into an associated cathode follower CF1 to CF5, the details of which are shown in Fig. 8. The purpose of interposing the cathode follower between the flip-flop and the one out of thirty-two matrix is to prevent the flip-flop from being too heavily loaded and to provide a more exact voltage indicating the state of the flip-flop. When the flip-flop is in a given state, the cathode of the follower is close to the plate supply voltage of the flip-flop; when the flip-flop is in the other state, the cathode follower is cut off and the cathode is at a voltage somewhat higher than the cathode supply voltage. As the magnetic drum upon which the binary numbers have been recorded rotates, the cathode followers assume varying conditions in accordance with the binary numbers that are in the form of magnetized spots passing under the magnetic heads.

Consequently, it may be seen that in order for sender 7 to transmit a signal through pentode gate SGP0, the suppressor grid 5 must be supplied with a positive voltage from the one of thirty-two matrix. From Fig. 8 it may be seen that output 0 which is connected to pentode gate SGP0 is energized when the left-hand portions of cathode followers CF2, CF3, CF4 and CF5 are energized, and when the right-hand portion of CF1 is energized. In such a case the cathodes of the conducting followers are relatively close to the plate supply voltage of the flip-flop, supplying them, and the diodes of output 0 will be biased blocking. Since output 0 is connected to the cuppressor grid 5 of pentode gate SGP0 a positive pulse will be transmitted to that grid causing the tube to conduct. As a result, the high frequency voltage of oscillator 7 which we have thus far traced to the control grid of pentode gate SGP0 is now transmitted to the common load impedance of Fig. 1, a detail of which is shown in Fig. 5. At this juncture it should be understood that the explanation which has been offered for the energization of output 0 applies to the remainder of the output leads in the one of thirty-two matrix. These remaining leads are consecutively energized as the binary number assigned to each lead is reproduced in the cathode followers. The cathode followers bias blocking all of the diodes of the output lead that is energized. It should also be recognized that what has been said of sender 7 in transmitting a signal through the scanner as far as the common load impedance is also true of any of the senders from 0 to 6 that may be active at that time. Consequently, in the maximum case, with senders 0 to 7 active, eight distinct frequencies may be simultaneously superimposed on the control grid 4 of pentode gate SGP0. In such a case, when the suppressor grid 5 of pentode gate SGP0 is driven positive by the one of thirty-two matrix, currents at eight different frequencies are transmitted to the common load impedance.

Figure 9:
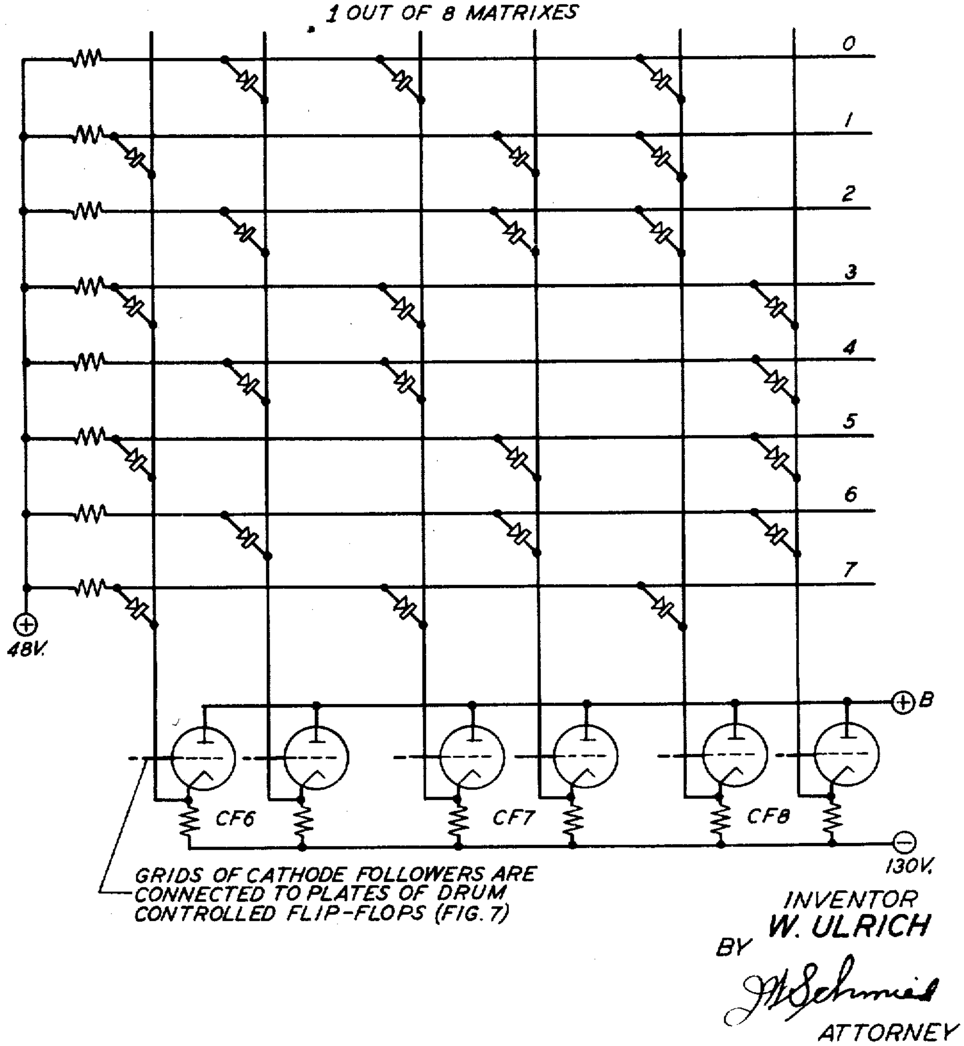
Fig. 9 is a diagram of the diode matrix controlled by three binary digits which energizes one output lead and one suppressor gated pentode out of a second group of eight.

Since we have been tracing the signal of sender 7, it is necessary to separate the frequency corresponding to that sender from the remaining frequencies. This is the function of pentode filter gates PFG0 to PFG7, and the one of eight matrix. A detail of the pentode filter gate may be seen in Fig. 6. Each pentode filter gate has a filter in its output 6 which will pass only one of the eight oscillator frequencies and reject the others. As seen from Fig. 1, each pentode filter gate can have as many as eight separate frequencies imposed on its control grid 7 at the same instant of time. In order for these signals to pass through the tube the suppressor grid 8 must be driven positive. This function is accomplished by the one of eight matrix, a detail of which is shown in Fig. 9. The operation and function of the one of eight matrix is similar to the one of thirty-two matrix and the foregoing explanation of the latter applies equally to the former.

Also the explanation of flip-flops FF6 to FF8 and magnetic head and reading amplifiers HA6 to HA8, are similar to the corresponding elements in the one of thirty-two matrix and need not be elaborated further.

If we assume that the pentode filter gate PFG7 is the only one in which the output filter will pass the frequency generated by oscillator 7, then by energizing positively the suppressor grid 8 of pentode filter gate PFG7 only that frequency will pass into the detector and amplifier of Fig. 1. The suppressor grid 8 of pentode filter gate PFG7 is energized when the left-hand portions of cathode followers CF6, CF7 and CF8 are energized, thereby energizing output 7 of the one out of eight matrix in Fig. 9 and the suppressor grid 8 of pentode filter gate PFG7. Since, in this example, the binary numbers assigned to pentode gate SGP0 appear in the same slot of the drum as the binary numbers assigned to pentode filter gate PFG7, a unique path has been establishd at the same instant by the two controlling matrices. This path may now be traced in Fig. 1 through the scanner from sender 7, to diode keyer DK7, pedance to the pentode filter gate PFG7 to the detector and amplifier to the scanner output lead 9.

Thus it may be seen that, although any random number of senders may be active at the time it is desired to scan sender 7, by means of the foregoing the condition of sender 7 and only sender 7 will appear on the output lead 9 of the scanner at that time.

The output lead 9 of the scanner in the exemplary embodiment of Fig. 1 is shown as energizing a writing amplifier and magntic head WHA1 in order to record the condition of sender 7 in the slot having the binary digits assigned to sender 7. Similarly a record of the condition of all other senders is recorded in the slot whose binary digits will cause the controlling matrices to select that sender. This record may be utilized for any desired purpose.

For the purpose of disclosing an application of the output of the scanner of this specification as it would be employed in connection with previously known devices, reference may be made to two earlier disclosures of such devices as set forth below:

Th output lead 9 may be connected to the input lead of amplifier (44) of Fig. 6 of the Brooks-McGuigan-Murphy application Serial No. 208,192, filed January 27, 1951, now Patent No. 2,738,382 of March 16, 1956. In accordance with the apparatus controlled by the said conductor (45) of the said patent a record would then be made of the called or dialed line number together with the number of the sender with which was associated the relay repeating the dialed pulses.

Alternatively, the output lead 9 could be connected to the conductor (45) of Fig. 1 of the said Brooks-McGuigan-Murphy patent in which case the information registered is the number of the active sender or senders.

Figure 10:
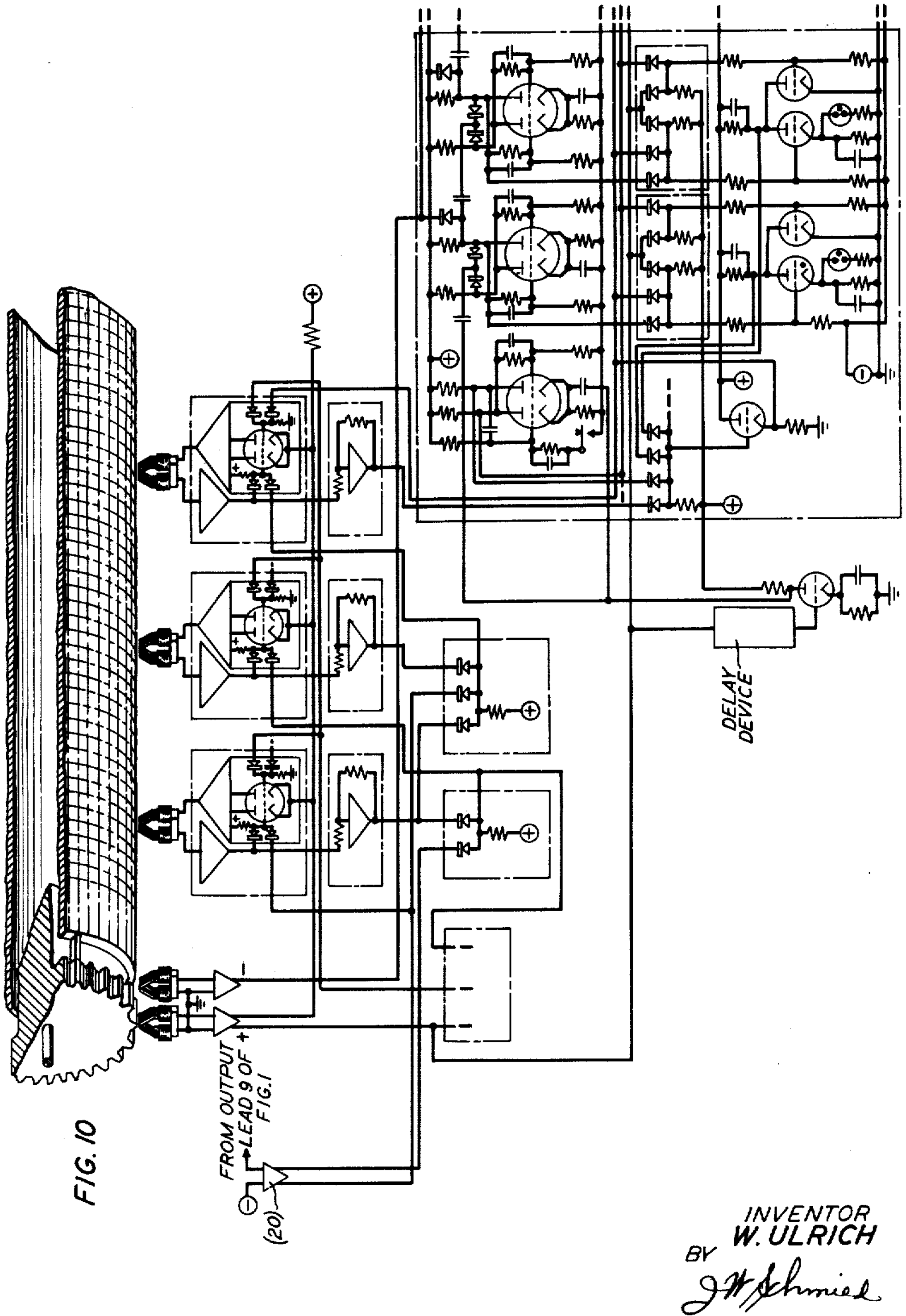
Fig. 10 is a circuit diagram of equipment suitable for recording the conditions of the devices scanned in accordance with the present invention.

Analogously, in the case of the McGuigan-Murphy-Newby Patent No. 2,700,148 of January 18, 1955, one may remove the conductor leading to the scanning plates and the tube (21) thereof together with all circuits and apparatus controlling said tube and connect the output lead of the present scanner to the input of amplifier (20) of Fig. 1 thereof. The numbers in parentheses in this and the two foregoing paragraphs indicate reference characters of the said prior applications. This arrangement is shown in Fig. 10 and is fully explained in said patent to McGuigan-Murphy-Newby, the pertinent portions of which are herewith incorporated by reference. The function of this last named system then is to record on a magnetic surface, signals such as telephone dial pulses originating in a plurality of sending devices, and displaying these signals in a registering mechanism which also indicates the identity of the sender originating the signals.

It is to be understood that the details of oscillators 0 to 7 and the detector and amplifier of Fig. 1 are well known in the art and are therefore not set forth at length.

It is further to be understood that the specific embodiments set forth are illustrative and may be modified or rearranged without departing from the spirit of the invention.

What is claimed is:

1. In combination, a plurality of devices to be scanned, electrical scanning means comprising a plurality of gate devices arranged in stages, means for connecting said gate devices of one of said stages in tandem with the said gate devices of another of said stages, a plurality of input terminals connected to said gate devices of one of said stages, means for connecting said devices to be scanned to the gate devices of said last-mentioned stage, a source of alternating current connected to said input terminals, an output circuit connected to the gate devices of another of said stages and means for selectively energizing only one of said gate devices in a plurality of said stages selectively and simultaneously to form an alternating-current transmission path from said alternating-current source including said tandemly connected stages and said output circuit under control of a selected one of said devices to be scanned.

2. In combination, a plurality of devices to be scanned, electrical scanning means comprising a plurality of gate devices arranged in stages, means for connecting said gate devices of one of said stages in tandem with the said gate devices of another of said stages, a plurality of input terminals connected to said gate devices of one of said stages, means for connecting said devices to be scanned to the gate devices of said last-mentioned stage, a source of alternating current connected to said input terminals, an output circuit connected to the gate devices of another of said stages and means for selectively energizing only one of said gate devices in a plurality of said stages selectively and simultaneously to form an alternating-current transmission path from said alternating-current source to said output circuit under control of a selected one of said devices to be scanned; said means for energizing one of said gate devices in said plurality of said stages comprising magnetic means for storing coded identifying conditions identifying said devices to be scanned, diode matrices connected to and controlled by said magnetic means, a plurality of output terminals connected to said diode matrices whereby a selected group of said output terminals is selectively energized, and means for connecting said output terminals to said gate devices.

3. In combination, a plurality of devices to be scanned, electrical scanning means comprising a plurality of gate devices arranged in stages, means for connecting said gate devices of one of said stages in tandem with the said gate devices of another of said stages, a plurality of input terminals connected to said gate devices of one of said stages, means for connecting said devices to be scanned to the gate devices of said last-mentioned stage, a source of alternating current connected to said input terminals, an output circuit connected to the gate devices of another of said stages and means for selectively energizing only one of said gate devices in a plurality of said stages selectively and simultaneously to form an alternating-current transmission path from said alternating-current source to said output circuit under control of a selected one of said devices to be scanned; said means for energizing one of said gate devices in said plurality of stages comprising a closed continuous magnetic surface having a plurality of binarily registered magnetic conditions previously impressed thereon, magnetic heads positioned adjacent said surface for transforming the magnetic conditions on said surface to electrical conditions, reading amplifiers connected to and controlled by said heads for amplification of the electrical conditions, flip-flops connected to and controlled by said reading amplifiers, a plurality of diode matrices, means for connecting said flip-flops to said diode matrices, a plurality of output terminals connected to said diode matrices whereby a selected group of said output terminals is sequentially energized and means whereby said gate devices are connected to said output terminals.

4. In combination, a plurality of devices to be scanned, electrical scanning means comprising a plurality of gate devices arranged in a stage, means for connecting said stage to said devices to be scanned, a plurality of input terminals connected to said gate devices of said stage, a source of alternating current connectable to said input terminals, means for connecting said alternating-current source to said input terminals, a plurality of similar stages comprising other pluralities of gate devices connected in tandem with the gate devices of said first mentioned stage, an output circuit connected to the gate devices of one of said stages, and means for selectively energizing one of said gate devices in a plurality of said stages simultaneously to provide an electrical transmission path for conveying alternating current from a selected one of said input terminals through said tandemly connected stages to said output circuit.

5. In a scanning device in combination with a plurality of devices to be scanned, a first and second stage of normally non-conducting electronic gate devices, means for connecting said stages in tandem, a plurality of input terminals for said scanning device, means for connecting a different group of said input terminals to each of said gate devices of said first stage, a plurality of electrical oscillators each having a different frequency, means for supplying a different frequency from said oscillators to each of said input terminals connected to one of said gate devices, said first stage gate devices being adapted to simultaneously pass a plurality of frequencies, frequency selective means connected to said second stage of gate devices, an output circuit connected to said frequency selective means whereby a single frequency is transmitted to said output circuit, means for selectively rendering one of said gate devices in each of said stages conductive simultaneously to provide an alternating-current transmission path from a selected one of said input terminals to said output circuit.

6. In a scanning device in combination with a plurality of devices to be scanned, a first and second stage of normally non-conducting electronic gate devices, means for connecting said stages in tandem, a plurality of input terminals for said scanning device, means for connecting a different group of said input terminals to each of said gate devices of said first stage, a plurality of electrical oscillators each having a different frequency, means for supplying a different frequency from said oscillators to each of said input terminals connected to one of said gate devices, frequency selective means connected to said second stage of gate devices, an output circuit connected to said frequency selective means whereby a single frequency is transmitted to said output circuit, means for selectively rendering one of said gate devices in each of said stages conductive simultaneously to provide an alternating-current transmission path from a selected one of said input terminals to said output circuit; said means for supplying a different frequency from said oscillators to each of said input terminals connected to one of said gate devices in said first stage comprising diode keyers connected to said devices to be scanned, means for connecting said diode keyers to said oscillators whereby said diode keyers gate signals from said oscillators in accordance with the condition of the devices to be scanned and means for connecting said diode keyers to said input terminals.

7. In a scanning device in combination with a plurality of devices to be scanned, a first and second stage of normally non-conducting electronic gate devices, means for connecting said stages in tandem, a plurality of input terminals for said scanning device, means for connecting a different group of said input terminals to each of said gate devices of said first stage, a plurality of electrical oscillators each having a different frequency, means for supplying a different frequency from said oscillators to each of said input terminals connected to one of said gate devices, frequency selective means connected to said second stage of gate devices, an output circuit connected to said frequency selective means whereby a single frequency is transmitted to said output circuit, means for selectively rendering one of said gate devices in each of said stages conductive simultaneously to provide an alternating-current transmission path from a selected one of said input terminals to said output circuit; said means for selectively rendering a gate device in each of said stages conductive simultaneously comprising magnetic means for storing coded identifying binary conditions corresponding to said devices to be scanned, a first and second diode matrix connected to and controlled by said magnetic means, a plurality of output terminals connected to said dioded matrices whereby a selected group of said output terminals is sequentially energized, and means for connecting said electronic gate devices to said output terminals whereby a selected one of said gate devices in each of said stages is rendered conductive simultaneously to provide an alternating-current path from a selected one of said input terminals to said output circuit.

8. In combination, with a plurality of electrical two state devices to be scanned, electrical scanning means comprising diode keyers connected to said devices to be scanned, a plurality of alternating-current oscillators having different frequencies, means for connecting said oscillators to said diode keyers in groups, means including said diode keyers whereby said diode keyers gate signals from said oscillators in accordance with the condition of said devices to be scanned, a first group of gate devices connected to said diode keyers and adapted to simultaneously pass said signals, a second group of frequency selective gate devices connected in tandem with said first group and adapted to pass one of said signals, an output circuit connected to said second group of frequency selective gate devices, means for selectively and simultaneously energizing one of said gate devices in each of said first and second groups to provide an electrical transmission path from one of said diode keyers to said output circuit.

9. In combination, with a plurality of electrical two-stage devices to be scanned, electrical scanning means comprising diode keyers connected to said devices to be scanned, a plurality of alternating-current oscillators having different frequencies, means for connecting said oscillators to said diode keyers in groups, means including said diode keyers whereby said diode keyers gate signals from said oscillators in accordance with the condition of said devices to be scanned, a first group of gate devices connected to said diode keyers, a second group of frequency selective gate devices connected in tandem with said first group, an output circuit connected to said second group of frequency selective gate devices, means for selectively and simultaneously energizing one of said gate devices in each of said first and second groups to provide an electrical transmission path from one of said diode keyers to said output circuit; said means for simultaneously energizing one of said gate devices in each of said first and second groups comprising magnetic means for storing a plurality of binarily registered conditions arranged in sets constituting binary numbers, a first and second diode matrix connected to and controlled by said magnetic means, means for connecting said first diode matrix to said first group of gate devices, and means for connecting said second diode matrix to said second group of gate devices whereby said gate devices in each of said groups are selectively rendered conductive.

10. In a scanning device in combination, a plurality of two state electrical devices to be scanned, electrical scanning means comprising a plurality of keyers equal in number to the number of devices to be scanned and responsive to the conditions of said devices to be scanned, means for connecting said keyers to said devices to be scanned, a source of alternating current, means for connecting said alternating-current source to said keyers whereby said keyers transmit alternating current from said alternating-current source in accordance with the condition of said devices to be scanned, a plurality of gate devices connected in tandem with said keyers, an output circuit connected to said gate devices and means for selectively and sequentially rendering said gate devices conductive to provide an alternating-current transmission path from a selected one of said keyers through said gating devices to said output circuit.

11. In a scanning device in combination, a plurality of two-state electrical devices to be scanned, electrical scanning means comprising a plurality of keyers equal in number to the number of devices to be scanned and responsive to the conditions of said devices to be scanned, means for connecting said keyers to said devices to be scanned, a source of alternating current, means for connecting said alternating-current source to said keyers whereby said keyers transmit alternating current from said alternating-current source in accordance with the condition of said devices to be scanned, a plurality of gate devices connected in tandem with said keyers, an output circuit connected to said gate devices and means for selectively and sequentially rendering said gate devices conductive to provide an alternating-current transmission path from a selected one of said keyers to said output circuit; said means for selectively rendering said gate devices conductive comprising magnetic means including a plurality of binarily registered conditions previously impressed thereon, a diode matrix connected to and controlled by said magnetic means, means for connecting said diode matrix to said gate devices whereby said gate devices are selectively rendered conductive.

12. In combination, with a plurality of devices, each having two states at random instants of time, each state being manifested by a different electrical voltage, means for scanning said devices and determining and recording the state of said devices at the times said devices are scanned comprising a plurality of oscillators, diode keyers equal to the number of devices to be scanned, means for connecting said devices to be scanned and said oscillators to said diode keyers whereby said diode keyers control electrical signals from said oscillators in accordance with the condition of said devices to be scanned, a first group of gating elements connected to said diode keyers and adapted to simultaneously pass said electrical signals, a second group of frequency selective gating elements connected in tandem with said first group and adapted to pass one of said electrical signals, a recording device capable of changing its record at a rate at least equal to the number of said devices to be scanned multiplied by the number of changes of record of each device desired per unit of time, means for connecting said recording device to said second group of gating elements, and means for sequentially rendering conductive one gating element in each of said first and second groups to provide an electrical transmission path from a selected one of said diode keyers to said recording device.

13. In combination, with a plurality of devices, each having two states at random instants of time, each state being manifested by a different electrical voltage, means for scanning said devices and determining and recording the state of said devices at the times said devices are scanned comprising a plurality of oscillators, diode keyers equal to the number of devices to be scanned, means for connecting said devices to be scanned and said oscillators to said diode keyers whereby said diode keyers control electrical currents from said oscillators in accordance with the condition of said devices to be scanned, a first group of gating elements connected to said diode keyers, a second group of frequency selective gating elements connected in tandem with said first group, a recording device capable of changing its record at a rate at least equal to the number of said devices to be scanned multiplied by the number of changes of record of each device desired per unit of time, means for connecting said recording device to said second group of gating elements, and means for sequentially rendering conductive one gating element in each of said first and second groups to provide an electrical transmission path from a selected one of said diode keyers to said recording device; said means for selectively rendering conductive one gating element in each of said groups comprising a closed continuous magnetic surface having a plurality of binarily registered magnetic conditions previously impressed thereon, magnetic heads positioned adjacent said surface for transforming the magnetic conditions on said surface to electrical conditions, reading amplifiers connected to and controlled by said heads for amplification of the electrical conditions, flip-flops connected to and controlled by said reading amplifiers to signify said electrical conditions, cathode followers connected to and controlled by said flip-flops for stable indication of the electrical conditions, diode matrices connected to said cathode followers, a plurality of output terminals connected to said diode matrices, means for connecting said gating elements to said output terminals whereby a selected one of said gate devices in each of said groups is selectively rendered conductive.

14. In combination, with a plurality of devices, each having two states at random instants of time, each state being manifested by a different electrical voltage, means for scanning said devices and determining and recording the state of said devices at the times said devices are scanned comprising a plurality of oscillators, diode keyers equal to the number of devices to be scanned, means for connecting said devices to be scanned and said oscillators to said diode keyers whereby said diode keyers control electrical currents from said oscillators in accordance with the condition of said devices to be scanned, a first group of gating elements connected to said diode keyers, a second group of frequency selective gating elements connected in tandem with said first group, a recording device capable of changing its record at a rate at least equal to the number of said devices to be scanned multiplied by the number of changes of record of each device desired per unit of time, means for connecting said recording device to said second group of gating elements, and means for sequentially rendering conductive one gating element in each of said first and second groups to provide an electrical transmission path from a selected one of said diode keyers to said recording device; said recording means comprising magnetic means for storing conditions corresponding to the electrical conditions of said devices at the times said devices are scanned, means for identifying the particular one of said scanning devices to which the stored conditions relate and means for deriving electrical signals from said stored conditions.

15. In combination with a plurality of devices to be scanned each having two irregularly varying states, each state being manifested by an electrical voltage condition different from that of the other, a conductor upon which said voltage conditions are successively impressed, a medium on which a plurality of binarily registered conditions are arranged in sets constituting binary numbers numerically equaling the total number of such devices to be scanned, a high speed recording device capable of changing its record at a rate equal to the number of such devices to be scanned divided by the minimum period for either state, means including readers for said binary numbers, binary flip-flops and matrices of diodes for sequentially connecting each of said devices to be scanned over a path to said recording device under control of said binarily registered conditions whereby said changing conditions of said devices to be scanned are recorded by said recording device in ordered sequence.

References Cited in the file of this patent

UNITED STATES PATENTS 2,609,451 Hansen ---------------- Sept. 2, 1952
2,643,172 Reiss ------------------ June 23, 1953